UNITED STATES PATENT OFFICE.

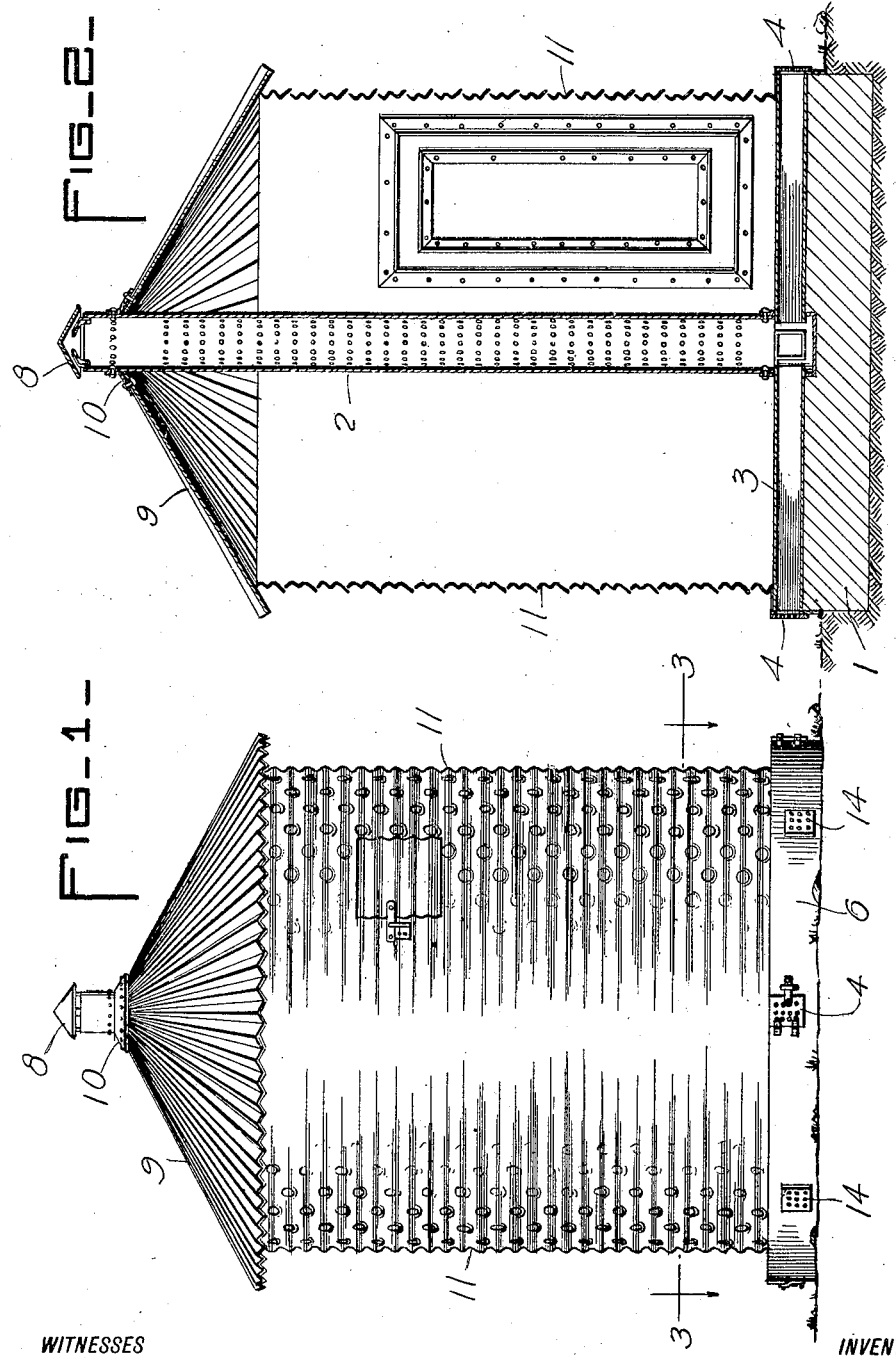

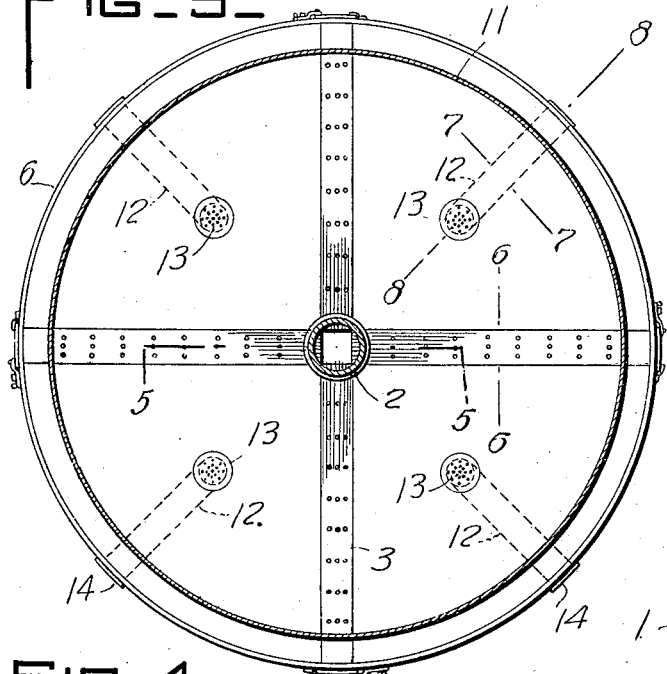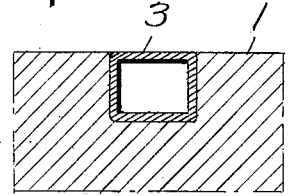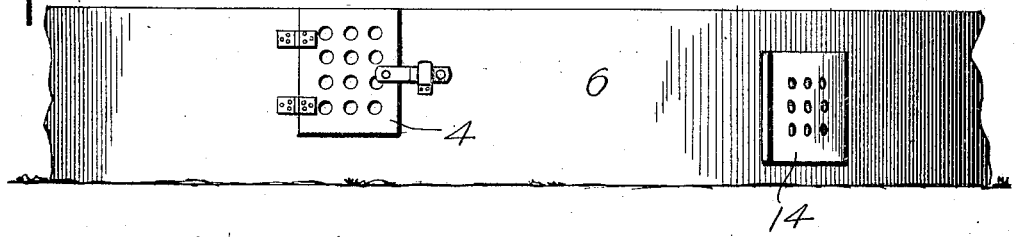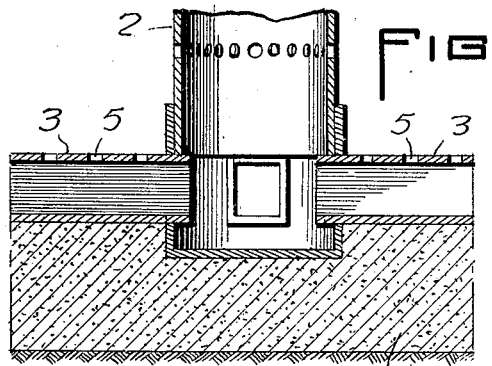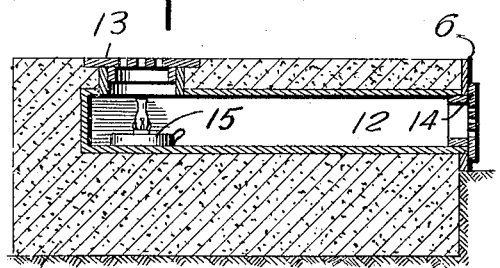

LIZZIE H. DICKELMAN, OF FOREST, OHIO.

VENTILATED GRAIN-STOREHOUSE.

1,328,132.  Specification of Letters Patent.  Patented Jan. 13, 1920.

Application filed February 14, 1917. Serial No. 148,667.

*To all whom it may concern:*

Be it known that I, LIZZIE H. DICKELMAN, a citizen of the United States, and a resident of Forest, in the county of Hardin and State of Ohio, have invented a certain new and useful Improvement in Ventilated Grain-Storehouses, of which the following is a specification.

My invention relates to improvements in ventilated grain storehouses, and it consists in the combinations, constructions, and arrangements herein described and claimed.

An object of my invention is to primarily provide a corn crib in which the corn may be effectively cured and which is rat-proof and vermin-proof.

A further object of my invention is to provide a grain storehouse having auxiliary means for introducing artificial heat, so as to overcome the difficulties of bringing the grain to maturity during wet or damp weather.

A further object of my invention is to provide a device of the type described which is easily set up and which, when placed in position, cannot be easily overturned by the wind.

My invention is illustrated in the accompanying drawings forming a part of this application, in which:

Figure 1 is a side elevation of the grain storehouse;

Fig. 2 is a central vertical section through the device;

Fig. 3 is a horizontal section along the line 3—3 of Fig. 1;

Fig. 4 is an enlarged detail view of a portion of the base ring;

Fig. 5 is a section along the line 5—5 of Fig. 3;

Fig. 6 is an enlarged section along the line 6—6 of Fig. 3;

Fig. 7 is an enlarged section along the line 7—7 of Fig. 3;

Fig. 8 is an enlarged section along the line 8—8 of Fig. 3.

The device which forms the subject of the present invention is an improvement over that set forth in my prior application, Serial 866,435, filed October 13, 1914, for patent on corn crib, now patent 1,219,267, March 13, 1917. In said prior application no means was disclosed for the artificial heating of the air currents by means of which the grain is treated. The main features of construction of the storehouse were, however, treated in the prior application, and in the present application I will refer briefly to those parts.

In carrying out my invention I provide a base 1 preferably of concrete, which supports a central ventilated shaft or tube 2, this tube being preferably of metal and being perforated. Near the bottom of the shaft 2 are disposed radiating pipes or tubes 3, which communicate at their inner ends with the central shaft 2, and whose outer ends are open to the atmosphere, perforated doors 4, see Fig. 4, being provided for permitting access to the interior of the tubes 3 for the removal of dust and dirt. The doors 4, however, keep out mice, rats, and vermin.

The tubes 3 are preferably perforated as shown at 5 on their upper sides. As will be seen from Fig. 5, the tubes 3 are embedded in the concrete base 1, the tops of the tubes being flush with the upper surface of the base. A metal ring 6 is disposed concentrically with respect to the central air shaft 2, the plastic concrete being filled in between the air shaft, tubes 3, and the ring 6, thereby making a solid base.

The air shaft 2 is covered with a ventilating hood 8. A roof 9 is secured to the air shaft at 10. Circular walls 11 of perforated sheet metal are carried by the base 1, and extend upwardly to the roof 9.

In addition to the parts mentioned above, the majority of these parts being disclosed in the said prior application, I provide auxiliary air conduits 12. These air conduits extend inwardly from the outside of the base, and thence upwardly being covered at their inner ends by perforated thimbles 13, whose upper surfaces are flush with the upper surface of the base, or, in other words, flush with the floor of the grain storehouse.

The outer end of each auxiliary air conduit 12 is covered by a perforated thimble 14.

From the foregoing description of the various parts of the device, the operation thereof may be readily understood.

In storing corn and similar grains, it often happens that damp weather will prevent the proper curing of the corn, especially if the corn becomes wet by beating rains. Ordinarily the ventilation afforded by air passing through the perforated walls 11 through the corn and into the central air shaft 2, will be sufficient to properly cure the corn.

In a long continued spell of damp weather the curing of corn may be hastened by the use of artificial means. To this end a lamp or other suitable heating means 15 is inserted in the auxiliary air conduit just underneath the perforated thimble 13. This will create a current of air which will enter the outer end of the auxiliary air conduit and will pass into the interior of the storehouse in heated condition. The air current will eventually find its way out through the body of the corn, and thence through the perforated air shaft 2.

Obviously the point of admission of air from the auxiliary conduit 12 into the interior of the grain storehouse might be varied without departing from the spirit of the invention.

In Fig. 3 I have shown four of these auxiliary air conduits with their delivery ends disposed substantially midway between the central air shaft 2 and the ring 6. These delivery points, however, are to be placed where experience determines it best for a given kind of grain and under given conditions. It will be noted that the delivery end of the conduit 12 is covered by a thimble 13 which, as stated before and as shown in the drawing, is flush with the floor of the storehouse. This prevents the grain from entering the conduit 12 but at the same time will permit of passage of air into the interior of the storehouse. The floor of the storehouse may be shoveled regardless of the thimble 13, since the latter is countersunk flush with the floor. The perforated closures 14 which, in the present instance are shown as thimbles, may be removed at any time when it is desired to withdraw the lamp 15, and is then replaced in order to prevent the entrance of rats, mice, and vermin.

I claim:—

1. A ventilated grain store house comprising a central perforated air shaft, laterally extending air tubes communicating with the interior of said air shaft at the bottom thereof, a base, said laterally extending tubes and the lower part of said air shaft being secured to said base, a roof secured to said central air shaft, walls carried by said base and joining said roof, and an auxiliary air conduit disposed in said base, one end of said auxiliary air conduit communicating with the outer atmosphere, the opposite end communicating with the interior of the store house between the central air shaft and the walls.

2. A ventilated grain store house comprising a central perforated air shaft, laterally extending air tubes communicating with the interior of said air shaft at the bottom thereof, a base, said laterally extending tubes and the lower part of said air shaft being secured to said base, a roof secured to said central air shaft, walls carried by said base and joining said roof, an auxiliary air conduit disposed in said base, one end of said auxiliary air conduit communicating with the outer atmosphere, the opposite end communicating with the interior of the store house between the central air shaft and the walls, and means for preventing the entrance of grain into said auxiliary air conduit, said last named means permitting the passage of air from the conduit into the interior of the grain store house.

3. A ventilated grain store house comprising a central perforated air shaft, laterally extending air tubes communicating with the interior of said air shaft at the bottom thereof, a base, said laterally extending tubes and the lower part of said air shaft being secured to said base, a roof secured to said central air shaft, walls carried by said base and joining said roof, a plurality of auxiliary air conduits, each of said air conduits communicating at one end with the outer atmosphere and at the opposite end with the interior of the store house between the central air shaft and the walls, and a perforated closure for said auxiliary air conduit, said closure preventing the entrance of grain into the auxiliary air conduit but permitting the passage of air.

4. A ventilated grain store house comprising a central perforated air shaft, laterally extending air tubes communicating with the interior of said air shaft at the bottom thereof, a base, said laterally extending tubes and the lower part of said air shaft being secured to said base, a roof secured to said central air shaft, walls carried by said base and joining said roof, a plurality of auxiliary air conduits, each of said air conduits communicating at one end with the outer atmosphere and at the opposite end with the interior of the store house between the central air shaft and the walls, a removable perforated closure for said auxiliary air conduit, said closure preventing the entrance of grain into the auxiliary air conduit but permitting the passage of air, and removable heating means disposed in the auxiliary conduit underneath said closure.

5. A ventilated grain store house comprising a central perforated air shaft, laterally extending air tubes communicating with the interior of said air shaft at the bottom thereof, a base, said laterally extending tubes and the lower part of said air shaft being secured to said base, a roof secured to said central air shaft, walls carried by said base and joining said roof, a plurality of auxiliary air conduits, each of said air conduits communicating at one end with the outer atmosphere and at the opposite end with the interior of the store house between the central air shaft and the walls, and a removable perforated thimble disposed in the end of the auxiliary conduit which communicates with the interior of the grain store house, the upper surface of the thimble being flush with the upper surface of the base, and removable heating means disposed in the auxiliary conduit underneath said perforated thimble.

6. A ventilated grain store house comprising a central perforated air shaft, laterally extending air tubes communicating with the interior of said air shaft at the bottom thereof, a base, said laterally extending tubes and the lower part of said air shaft being secured to said base, a roof secured to said central air shaft, walls carried by said base and joining said roof, a plurality of auxiliary air conduits, each of said air conduits communicating at one end with the outer atmosphere and at the opposite end with the interior of the store house between the central air shaft and the walls, a removable perforated thimble disposed in the end of the auxiliary conduit which communicates with the interior of the grain store house, the upper surface of the thimble being flush with the upper surface of the base, removable heating means disposed in the auxiliary conduit underneath said perforated thimble, and a perforated closure at the outer end of each of said auxiliary air conduits.

7. A ventilated grain store house comprising a central perforated air shaft, laterally extending air tubes communicating with the interior of said shaft at the bottom thereof, a base, said laterally extending tubes and the lower part of said air shaft being secured to said base, a roof secured to said central air shaft, perforated walls carried by said base and joining said roof, an auxiliary air conduit in said base, one end of said auxiliary conduit communicating with the outer air, the opposite end communicating with the interior of the store house between the central air shaft and the walls, means for preventing the entrance of grain into said auxiliary conduit, and a heating means disposed in said auxiliary conduit for causing a current of air to pass through the auxiliary conduit and into the interior of the store house.

LIZZIE H. DICKELMAN.